Nov. 6, 1945.  G. E. SORENSEN  2,388,582
METHOD OF AND APPARATUS FOR MEASURING CENTER SPACING
Filed June 28, 1941  3 Sheets-Sheet 1
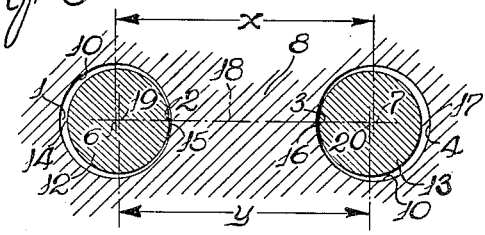
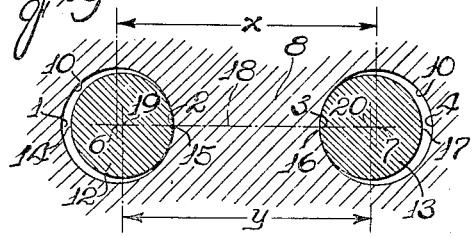
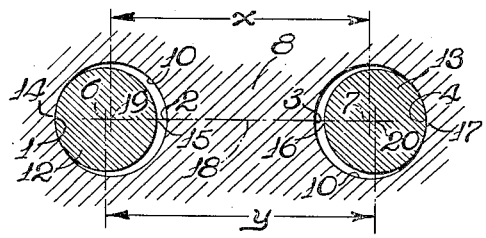
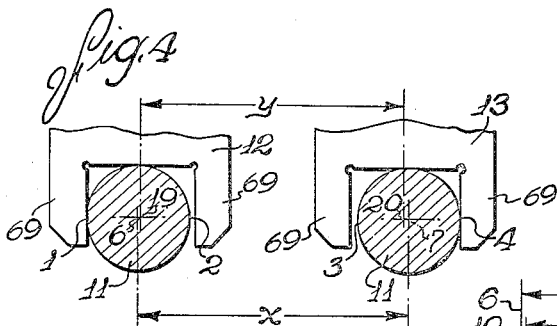
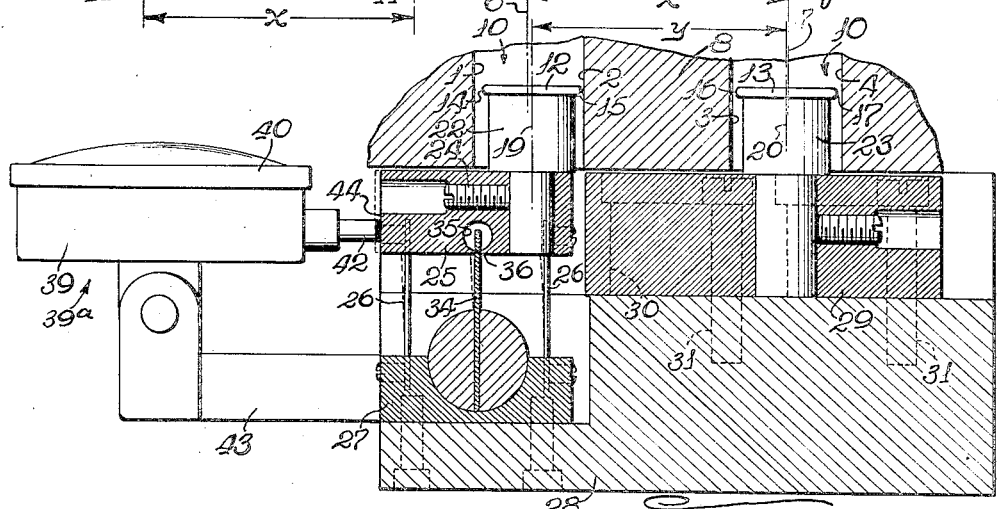
INVENTOR
George E. Sorensen
By Parker, Carlson, Pitzner-Hubbard
ATTORNEYS Nov. 6, 1945.    G. E. SORENSEN    2,388,582
METHOD OF AND APPARATUS FOR MEASURING CENTER SPACING
Filed June 28, 1941    3 Sheets-Sheet 2
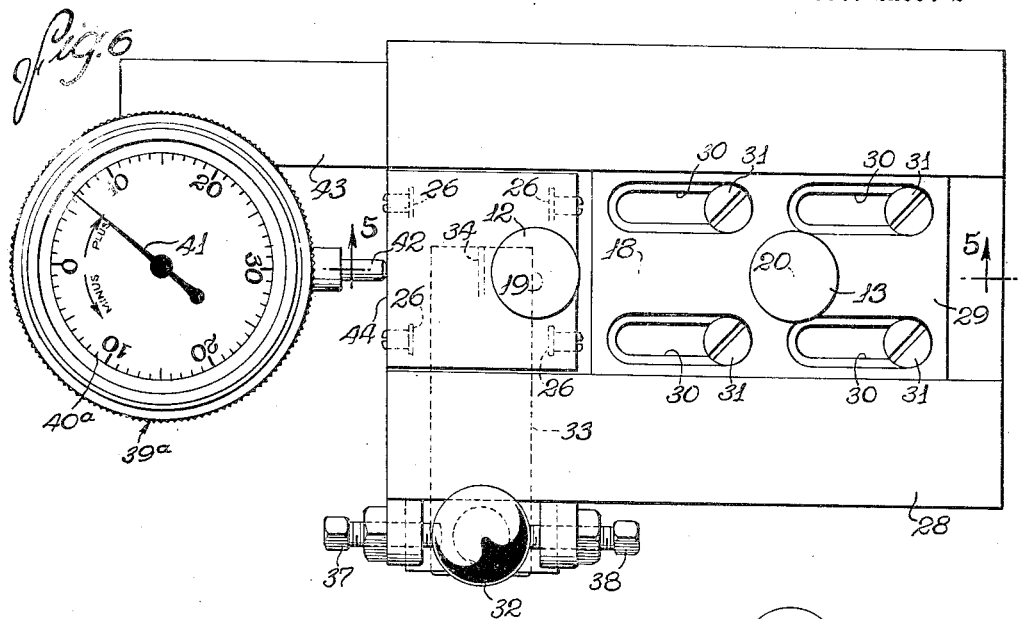
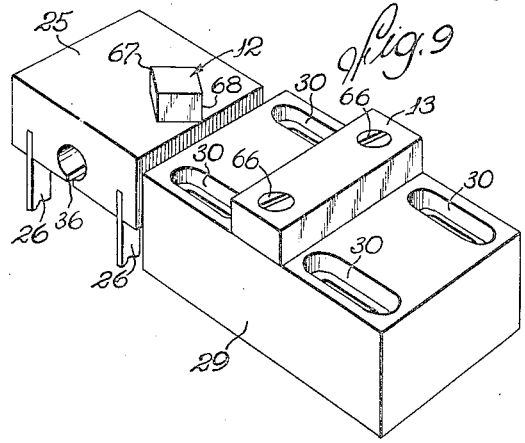
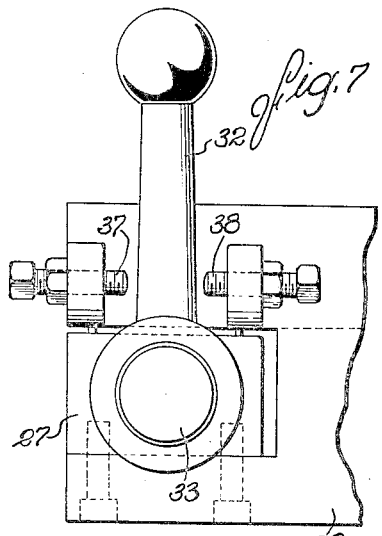
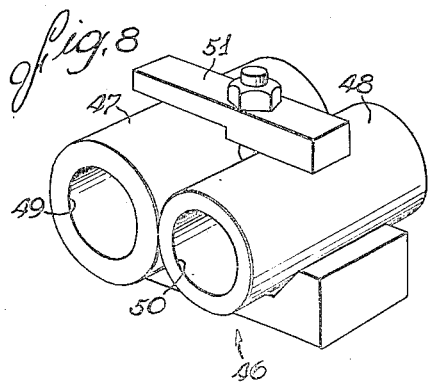
INVENTOR
George E. Sorensen
By Parker, Carlson, Pitzner & Hubbard
ATTORNEYS

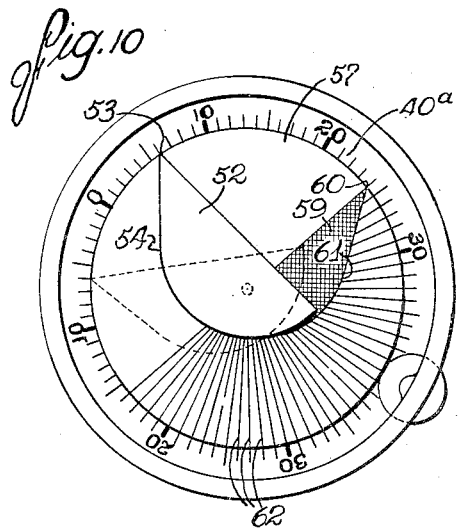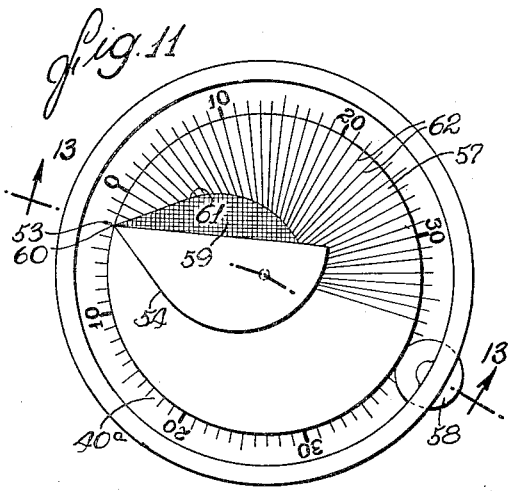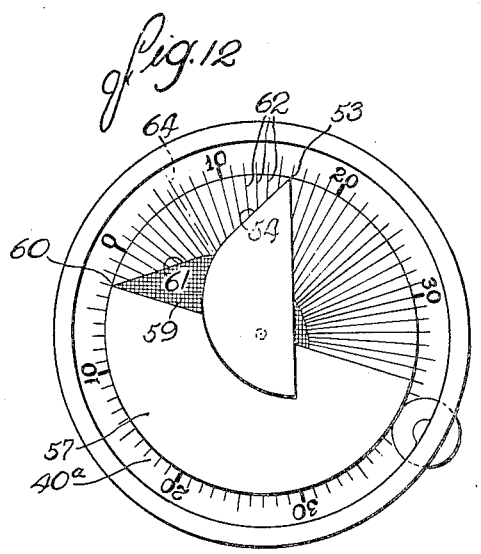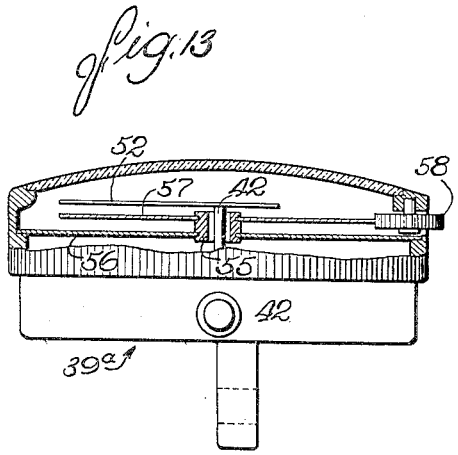

Patented Nov. 6, 1945

2,388,582

UNITED STATES PATENT OFFICE 2,388,582

METHOD OF AND APPARATUS FOR MEASURING CENTER SPACING

George E. Sorensen, Rockford, Ill., assignor to Woodward Governor Company, Rockford, Ill., a corporation of Illinois Application June 28, 1941, Serial No. 400,193

11 Claims. (Cl. 33—147)

This invention relates to the precision measurement of the center spacing of holes, slots, ribs, pins, or the like on work pieces, and the general object is to provide a novel method and apparatus by which such measurements may be made rapidly with greater accuracy than has been possible heretofore and without being affected by inaccuracies in the individual pairs of work surfaces.

A more detailed object is to provide a measuring apparatus and method involving the use of feelers interfitting with the work surfaces to be measured and relatively movable in opposite directions into engagement with the work surfaces and through distances jointly determining the measurement.

Another object is to provide a novel means for integrating the two readings by which the final measurement is determined.

The invention also resides in the novel construction of the measuring apparatus which facilitates its use as a precision inspection gauge and contributes to the simplicity and accuracy of the apparatus.

Other objects and advantages of the invention will become apparent from the following detailed description taken in conection with the accompanying drawings, in which Figures 1 to 3 inclusive illustrate successive steps in the method of measuring work pieces in accordance with the present invention.

Fig. 4 is a view of a modified feeler construction.

Fig. 5 is a longitudinal sectional view of the improved measuring instrument, the section being taken along the line 5—5 of Fig. 6.

Fig. 6 is a plan view.

Fig. 7 is a fragmentary side elevational view.

Fig. 8 is a perspective view of a master fixture.

Fig. 9 is a fragmentary perspective view of a modified form of the instrument.

Figs. 10, 11, and 12 are plan views of a modified dial indicator.

Fig. 13 is a section taken along the line 13—13 of Fig. 11.

The invention is susceptible of various modifications and uses and, therefore, I do not intend to limit the invention by the present exemplary disclosure, but aim to cover all modifications, alternative constructions, and methods falling within the spirit and scope of the invention as expressed in the appended claims.

The present invention aims to measure the center spacing $x$ of two pairs of surfaces 1, 2 and 3, 4 centered at 6 and 7. These may be internal surfaces such as the opposite sides of holes 10 in a work piece 8, the walls of spaced slots or grooves, or they may be the external surfaces of pins 11 (Fig. 4) or ribs projecting from the work piece.

The improved method involves the use of two feelers 12 and 13 having opposite side surfaces 14, 15 and 16, 17 adapted for point contact with the surfaces 1, 2, 3, and 4 respectively by relative movement between the feelers along a line 18 through the feeler centers 19 and 20 which have a known precise spacing $y$ hereinafter referred to as the master spacing. After this precise master spacing is established, the improved method is practiced by interfitting the feelers and work surfaces as shown in Fig. 1, moving the feelers together to limit positions determined as shown in Fig. 2 by engagement of the adjacent work and master surfaces 2, 15 and 3, 16, measuring the extent of such movement, relatively moving the feelers reversely to separate them and bring the other coacting surfaces 1, 14 and 4, 17 against each other as shown in Fig. 3, measuring the extent of this movement beyond the master spacing, and algebraically averaging the two measurements to thereby derive the deviation of the work center spacing $x$ from the master spacing $y$.

In the embodiment shown in Figs. 5 to 8, the feelers 12 and 13 comprise circular ribs on the upper ends of pins 22 and 23 and having diameters somewhat smaller than the holes 10. The pin 22 upstands from and is removably held by a set screw 24 in a block 25 mounted for movement along the line 18, the mounting preferably being as nearly frictionless as practicable. Such a mounting is provided herein by four vertical leaf springs 26 fastened by screws in slots at the corners of the block 25. The lower ends of the springs are similarly attached to a block 27 on a base 28 which may rest on a horizontal supporting surface while the measurement is being made. In addition to providing a substantially frictionless mounting, the springs 26 define the path of movement of the feeler more precisely than would be possible by employing slideways or other types of guides, thereby minimizing possible error.

The other pin 23 is normally stationary but preferably is mounted on the base 28 for adjustment along the line 18 toward and away from the movable feeler 12 so as to enable the instrument to be adapted readily for measuring differently spaced work centers. To this end, the lower end of the pin is received and held in a block 29 resting on the base and having parallel slots 30 receiving screws 31 which thread into the base and coact with the slots to guide the movement of the block. When tightened, after the desired spacing of the feelers has been established, the screws serve to clamp the block in adjusted position.

Means is provided for moving the movable feeler to opposite limits of its travel permitted by the work piece and under substantially the same pressure at each limit. In the present instance, this means comprises a hand lever 32 fast on a horizontal rockshaft 33 journaled in the block 27. The rocking motion is transmitted to the feeler supporting block 25 through a yieldable connection comprising herein a leaf spring 34 fastened to and projecting upwardly from the shaft 33 with its free end projecting into a recess 35 in the block 25 and between knife edges 36. Adjustable stops 37 and 38 determine the limits of swing of the lever and this range is somewhat greater than the movement of the feeler 12 permitted by the work piece to be measured. As a result, the spring 34 is bent in opposite directions and the same pressure is applied to the work by the feeler in both of its positions.

The movements of the feeler 12 may be measured on a standard dial indicator 39$^a$ having a scale 40$^a$ graduated in units of desired magnitude such as ten-thousandths of an inch. It is adjustable angularly relative to the indicator casing 39 by turning a knurled rim 40. The scale is adapted to read in either direction from zero and coacts with a pointer 41 on a central shaft which is turned in opposite directions by opposite reciprocatory movements of a pin 42 projecting radially from the casing. The indicator is mounted from beneath on an arm 43 projecting rigidly from the base 28 and supporting the indicator so that the rounded end of the actuating pin 42 bears against a vertical surface 44 on the forward end of the block 25. By employing a rocking type of hand actuator, it will be observed that the feeler may be shifted back and forth horizontally with a minimum tendency to shift the instrument as a whole along its supporting surface.

While the master spacing $y$ of the feelers may be established by micrometer measurement gauge blocks or the like, a special gauge or fixture 46 is preferably employed. This is adapted to interfit with the feelers and has holes precisely spaced. Such a gauge (see Fig. 9) may be formed by two tubes 47 and 48 having master holes 49 and 50 slightly larger than the feeler rims 12 and 13. The tube peripheries are ground to space the hole centers exactly, after which the tubes are fastened together by a clamp 51.

The instrument as above described may be used as follows to inspect work pieces and determine the variations of the hole spacing $x$ relative to the master spacing $y$. First, the master gauge 46 is fitted over the feelers 12 and 13 and the block 29 is adjusted along the line 18 until the indicator pointer 41 swings about equal distances in opposite directions in response to movements of the lever 32 against the opposite stops 37 and 38 after which the clamping screws are tightened. This approximate spacing of the feelers insures uniformity in the pressure applied to the work in the opposite limit positions of the feeler 12. Then, by turning the ring 40, the indicator scale is adjusted so that the pointer swings exactly the same number of divisions to each side of zero as the lever is moved to its opposite positions. In other words, when the pointer is at zero on the scale 40$^a$, the feeler centers 19 and 20 will be disposed at the master spacing $y$.

With the instrument thus adjusted, a work piece may be inspected or the deviation of the center spacing of its holes 10 from the master spacing determined in a simple and rapid procedure. First, the work piece is placed on the instrument with its holes interfitting with the feelers 12 and 13 as shown in Fig. 5. Then, the lever 32 is swung in one direction, for example, forwardly, thereby moving the block 25 forwardly until the stop 37 is encountered. In this movement, the feelers are separated along the line 18 to limits determined by the point to point engagement of the feeler surfaces 14 and 17 and the remote work surfaces 1 and 4 (see Fig. 3). The clockwise or plus swing of the indicator pointer with the parts thus positioned is noted. Next, the lever is swung reversely against the other stop 38 whereupon the spring 34 is flexed to press the feeler 12 toward the fixed feeler and to a limit position determined by engagement of the adjacent feeler and work surfaces 2, 15 and 3, 16 as shown in Fig. 2. As an incident to this, the pointer 41 swings to the left and the extent of the movement is noted. To determine the variation of the work hole spacing $x$ from the master $y$, the two readings are added algebraically and averaged. Thus, if the indicator graduations are .0001 and the left hand reading is $-5$ while the right hand reading is $+15$, the deviation is $$\frac{15-5}{2}$$

or plus .0005. This means that the holes 10 are spaced .0005 of an inch farther apart than the master spacing $y$. Similarly, a net swing of the pointer 5 units to the left indicates that the work holes are .0025 of an inch closer together than the master holes.

Where the deviation of the work hole spacing from the master spacing is greater than the range of the indicator dial, the right and left hand swings of the pointer may extend beyond the range of the indicator dial in which case it is necessary to note the number of revolutions as well as the readings in the limit positions of the pointer.

The invention also contemplates a novel dial construction which averages the pointer readings automatically. Such a dial is shown in Figs. 10 to 13. The regular scale 40$^a$ graduated in units of the desired magnitude is angularly adjustable as before. The pointer proper comprises a thin plate 52 fast on the shaft 42 and having a pointed outer end 53 which coacts with the scale 40$^a$. One side 54 of the plate diverges from the point 53 and then converges toward the axis so as to form a fairly uniform curve extending through a substantial angle preferably at least a half revolution. The exact shape of the curve and its rate of convergence toward the axis are immaterial.

Supported beneath the plate 52 in a bearing 55 fixed to the top plate 56 of the indicator casing is a disk 57 frictionally held in adjusted position. A friction wheel or gear 58 accessible from the exterior of the pointer casing engages the periphery of the disk so that the latter may be turned about the pointer axis. A darkened or contrasting area 59 corresponding in shape to the pointer 52 is marked on the disk 57. This terminates in a point 60 adjacent the scale 40$^a$ and its curved edge 61 is identical in curvature to the pointer edge 54 but is reversed. Straight lines 62 are marked on the disk and radiate from the curve 61 to the periphery of the disk where the spacing of the lines equals the graduations on the scale 40ª.

In the use of this type of scale, the instrument is adjusted as before for the master spacing, that is, so that the point 53 will be on zero when the feeler spacing equals the master spacing. Inspection of the work piece is accomplished in the following manner. The lever 32 is turned counter-clockwise as viewed in Fig. 7, moving the pointer 53 to the left of zero as shown in Fig. 11. Then, by turning the wheel 58, the disk 57 is turned to bring the point 60 thereon into coincidence with the point 53, the disk being thereby positioned to register the minus reading. Next, the lever position is reversed so as to swing the pointer clockwise to register the extent of the positive swing as shown in Fig. 12. With the parts thus held, the average reading is indicated by the point 63 of intersection of the curves 54 and 61, the reading being made by following outwardly along a radius 64 and to the scale 40ª using the lines 62 as guides. Thus, with a minus reading of 3 (Fig. 11) and a positive reading of 16 (Fig. 12), the deviation of the work center spacing from the master spacing is .00065 as indicated by the intersection point 63.

Fig. 9 shows a modified feeler construction adapting instrument for use in inspecting the spacing of parallel grooves. In this case, the feeler 13 comprises a bar having a width slightly less than one of the work grooves and fastened to the block 29 as by pins 66 so as to be disposed perpendicular to the line 18. The feeler 12 is designed for point contact with the walls of the other work groove. For this purpose, its head has edges 67 and 68 projecting in opposite directions along the line 18. The instrument thus constructed is used in the same way as the instrument previously described.

For measuring the center spacing of pins 11, the feelers 12 and 13 may be forked as shown in Fig. 4, each having projections 69 disposed on and coacting with opposite sides of the pins on the work piece.

It will be observed that with the simply constructed and conveniently operable apparatus above described, it is possible to measure the center spacing of holes, grooves, pins, or the like rapidly with substantially greater precision than has been possible heretofore. Such precision is attained by the unique way in which the feelers coact with the remote and adjacent points of the pairs of work surfaces coupled with the fact that substantially the same pressure is applied to the work at both limits of the feeler movements. Furthermore, the accuracy of the measurement is not influenced by inaccuracies in the sizes of the individual holes.

I claim as my invention:

1. Apparatus for measuring the center spacing of two pairs of surfaces comprising, in combination, two feelers each having two sides interfitting with one pair of said surfaces, means supporting one of said feelers for movement in opposite directions transversely of said surfaces to opposite limit positions respectively determined by the adjacent and remote ones of said surfaces, means for moving said feeler to said positions and causing the same to apply substantially equal pressures in the respective positions, and an indicator responsive to the movements of said movable feeler to said opposite limit positions.

2. Apparatus for measuring the center spacing of two pairs of surfaces comprising, in combination, two feelers each having two sides interfitting with one pair of said surfaces, means supporting one of said feelers for movement in opposite directions transversely of said surfaces to opposite limit positions respectively determined by the adjacent and remote ones of said surfaces, an actuator movable between fixed stops spaced according to said positions, yieldable means transmitting the motion of said actuator to said movable feeler, and an indicator responsive to the movements of said movable feeler.

3. Apparatus for measuring the center spacing of two pairs of surfaces comprising, in combination, two feelers interfitting with said pairs of surfaces, means supporting said feelers for relative movement in opposite directions transversely of said surfaces to opposite limit positions respectively determined by the adjacent and remote ones of said surfaces, a pointer responsive to the opposite movements of said feelers, a scale coacting with said pointer, a second pointer adjustable to register a position of said first pointer, and means carried by the respective pointers and coacting to indicate on said scale one half of the algebraic sum of the readings of the two pointers when in spaced relation.

4. Apparatus for measuring the center spacing of two pairs of surfaces comprising, in combination, two feelers interfitting with the respective pairs of said surfaces and relatively movable along a line through the feeler centers toward and away from each other to limit positions determined by engagement between the feelers and the adjacent and remote surfaces respectively, and means responsive to the opposite movements of said feelers beyond a known master spacing and giving a single indication of the difference between said master spacing and said center spacing.

5. Apparatus for measuring the center spacing of two pairs of surfaces comprising, in combination, a mechanism engageable with said surfaces and having a member movable in opposite directions through distances proportional to the deviation of said center spacing from a master spacing, and means responsive to the opposite movements of said member and operable to give a single indication equal to the deviation of said spacing from a predetermined master spacing.

6. The method of comparing the center spacing of two pairs of work surfaces of fixed spacing relative to the known center spacing of two pairs of master surfaces relatively movable along a line connecting their centers and adapted for point contact with the work surfaces, said method comprising the steps of interfitting the pairs of work and master surfaces for engagement with each other along said line, alternately moving said master centers toward and away from each other to limits determined by the engagement under a predetermined pressure of the remote and adjacent master surfaces with the remote and adjacent work surfaces respectively, and averaging the algebraic sum of the opposite movements of said master surfaces from said known spacing.

7. The method of comparing the center spacing of two pairs of work surfaces of fixed spacing relative to the known center spacing of two pairs of master surfaces relatively movable along a line connecting their centers and adapted for point contact with the work surfaces, said method comprising the steps of interfitting the pairs of work and master surfaces for engagement with each other along said line, alternately moving said master centers toward and away from each other to limits determined by the engagement of the remote and adjacent master surfaces with the corresponding work surfaces respectively, and measuring the opposite movements.

8. The method of measuring the differences in the center of spacing two spaced pairs of work surfaces relative to a predetermined master spacing of two pairs of surfaces interfitting with the corresponding work surfaces and relatively movable along a line connecting the centers, said method comprising separating said master centers along said line to a limit determined by engagement of the opposed master and work surfaces, measuring the extent of the separating movement of the master surfaces beyond said predetermined master spacing, moving said master centers toward each other to the limit determined by engagement of the other master and work surfaces with substantially the same predetermined pressure, and averaging the algebraic sum of the movements of the master surfaces in opposite directions from said master spacing.

9. The method of comparing the center spacing of two pairs of work surfaces of fixed spacing relative to the known center spacing of two pairs of relatively movable master surfaces, said method comprising the steps of interfitting the pairs of work and master surfaces for engagement with each other along said line, alternately moving said master centers toward and away from each other to limits determined by the engagement of the master surfaces with the remote and adjacent work surfaces respectively, and averaging the sum of the opposite movements of said master surfaces from said known spacing.

10. Apparatus for measuring the center spacing of two pairs of surfaces comprising, in combination, two feelers each having two sides interfitting with one pair of said surfaces, means supporting one of said feelers for movement in opposite directions transversely of said surfaces to opposite limit positions respectively determined by the adjacent and remote ones of said surfaces, an actuating member movable longitudinally of said feeler movement, and means yieldably transmitting the motion of said actuator to said movable feeler.

11. Apparatus for measuring the center spacing of two pairs of parallel work surfaces having, in combination, two feelers projecting substantially parallel to each other and mounted for lateral movement toward and away from each other along a straight line, flanges on said feelers providing circular peripheral surfaces lying in a common plane including said line and being of convex cross-sectional contour in a transverse plane whereby to provide for single point engagement with work surfaces at four points spaced along said line, means for relatively moving said feelers in either direction along said line, and means for indicating the extent of each of the opposite movements from a normal position of the feelers.

GEORGE E. SORENSEN.